US012234123B2

(12) United States Patent
Gou

(10) Patent No.: US 12,234,123 B2
(45) Date of Patent: Feb. 25, 2025

(54) ELEVATOR DOOR INTERLOCK DEVICE, ELEVATOR DOOR INTERLOCK OPERATION METHOD AND ELEVATOR SYSTEM

(71) Applicant: Otis Elevator Company, Farmington, CT (US)

(72) Inventor: Xingang Gou, Tianjin (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 18/508,797

(22) Filed: Nov. 14, 2023

(65) Prior Publication Data

US 2024/0367943 A1 Nov. 7, 2024

(30) Foreign Application Priority Data

May 6, 2023 (CN) ......................... 202310505495.2

(51) Int. Cl.
*B66B 13/16* (2006.01)
*B66B 9/00* (2006.01)

(52) U.S. Cl.
CPC ............ *B66B 13/165* (2013.01); *B66B 9/003* (2013.01)

(58) Field of Classification Search
CPC ....... B66B 13/12; B66B 9/003; B66B 1/2491; B66B 13/10; B66B 13/16
See application file for complete search history.

(56) References Cited

U.S. PATENT DOCUMENTS

| | | | |
|---|---|---|---|
| 1,725,041 | A | 8/1929 | Winder |
| 3,605,952 | A | 9/1971 | Lusti |
| 4,313,525 | A | 2/1982 | McDonald |
| 4,947,964 | A | 8/1990 | Husmann |
| 5,584,365 | A | 12/1996 | Tonna |
| 5,730,254 | A | 3/1998 | Nguyen |

(Continued)

FOREIGN PATENT DOCUMENTS

| | | | | |
|---|---|---|---|---|
| CN | 216235526 U | 4/2022 | | |
| DE | 102019211973 A1 * | 2/2021 | ........... | B66B 13/285 |
| EP | 1244595 B1 | 8/2004 | | |

OTHER PUBLICATIONS

Machinery Korea, "Up-sliding interlock switch for use in elevator doors by Dongin electric", accessed Dec. 5, 2023, video, https://www.youtube.com/watch?v=QXZdHf9pWXI, 1 page.

*Primary Examiner* — Diem M Tran
(74) *Attorney, Agent, or Firm* — CANTOR COLBURN LLP

(57) ABSTRACT

An elevator door interlock device, an elevator door interlock operation method and an elevator system. The elevator door interlock device is arranged on an elevator car and has a first state in which to operate a landing door lock at a current arrival position of the elevator car to open or close a landing door, and a second state in which it makes no contact with the landing door lock, and the elevator door interlock device is configured to be in the first state when the elevator car travels in a vertical direction, and to be in the second state when the elevator car travels in a horizontal direction and to switch to the first state to open or close the landing door after the elevator car reaches a landing door position, and to return to the second state when the elevator car continues to travel in the horizontal direction.

12 Claims, 3 Drawing Sheets

(56) References Cited

U.S. PATENT DOCUMENTS

| | | | |
|---|---|---|---|
| 6,446,759 | B1 | 9/2002 | Kulak et al. |
| 7,255,203 | B2 | 8/2007 | Rennetaud et al. |
| 7,398,862 | B2 | 7/2008 | Dziwak |
| 11,572,255 | B2 | 2/2023 | Kashiwakura |
| 2015/0014101 | A1 | 1/2015 | Tracey |

* cited by examiner

ELEVATOR DOOR INTERLOCK DEVICE, ELEVATOR DOOR INTERLOCK OPERATION METHOD AND ELEVATOR SYSTEM

FOREIGN PRIORITY

This application claims priority to Chinese Patent Application No. 202310505495.2, filed May 6, 2023, and all the benefits accruing therefrom under 35 U.S.C. § 119, the contents of which in its entirety are herein incorporated by reference.

TECHNICAL FIELD

The present disclosure relates to the technical field of electromechanical equipment, in particular to an elevator door interlock device, an elevator door interlock operation method, and an elevator system.

BACKGROUND

In many places such as business offices, industrial plants, residential buildings, especially in many high-rise buildings, people have installed and used various types of elevator equipment to transport people, goods, or pets to target floors, and thus obtained great convenience. With the continuous development of modern society, some buildings have become increasingly complex and sophisticated in structural construction, functional applications, and other aspects. It is possible that elevators not only need to travel in the vertical direction of the building, but also in the horizontal direction of the building. However, this demand poses challenges for elevator door systems, as the products in the prior art cannot meet the above operational requirements at the same time.

SUMMARY

In view of the foregoing, the present disclosure provides an elevator door interlock device, an elevator door interlock operation method, and an elevator system, so as to solve or at least alleviate one or more of the aforementioned problems and other problems in the prior art, or to provide an alternative technical solution for the prior art.

According to a first aspect of the present disclosure, an elevator door interlock device is first provided, which is arranged on an elevator car and has a first state in which it is allowed to operate a landing door lock at a current arrival position of the elevator car to open or close a landing door, and a second state in which it makes no contact with the landing door lock, and the elevator door interlock device is configured to be in the first state when the elevator car travels in a vertical direction, and to be in the second state when the elevator car travels in a horizontal direction and to switch to the first state to open or close the landing door after the elevator car reaches a landing door position, and to return to the second state when the elevator car continues to travel in the horizontal direction.

In an elevator door interlock device according to the present disclosure, optionally, the elevator door interlock device comprises two assemblies arranged opposite to each other, each assembly comprising: a base portion arranged on the elevator car; an operating portion movably mounted on the base portion; and a drive portion configured to drive the operating portion to move on the base portion such that the operating portion is capable of reaching a first position and a second position, wherein when respective operation portions of the two assemblies reach the first position and the second position, the elevator door interlock device is in the first state and the second state, respectively.

In an elevator door interlock device according to the present disclosure, optionally, each assembly further comprises a linkage mechanism, and one end of the linkage mechanism is connected to a power output end of the drive portion and the other end of the linkage mechanism is connected to the operating portion.

In an elevator door interlock device according to the present disclosure, optionally, an operating zone is defined by the operation portions of the two assemblies currently reaching the first position, such that after a roller of the landing door lock enters the operating zone, the landing door is opened or closed through operation of the roller by the operating portion in the first state.

In an elevator door interlock device according to the present disclosure, optionally, the base portion is provided with a guide rail, and the operating portion is configured to move along the guide rail.

In an elevator door interlock device according to the present disclosure, optionally, a limiting portion is arranged on the guide rail, and the limiting portion is configured to make contact with the operating portion and limit its relative displacement with respect to the guide rail in the horizontal direction.

In an elevator door interlock device according to the present disclosure, optionally, the limiting portion comprises a groove or a protrusion arranged along a length direction of the guide rail.

In an elevator door interlock device according to the present disclosure, optionally, the drive portion comprises a motor and is configured to drive the operating portion to move on the base portion according to a control signal, the control signal including a position signal of the elevator car.

In an elevator door interlock device according to the present disclosure, optionally, the elevator door interlock device further comprises a controller configured to control operation of the drive portion.

In addition, according to a second aspect of the present disclosure, an elevator door interlock operation method is also provided, which comprises the steps of: arranging an elevator door interlock device having a first state and a second state on an elevator car, wherein the elevator door interlock device is allowed to operate a landing door lock at a current arrival position of the elevator car to open or close a landing door in the first state, and to make no contact with the landing door lock in the second state; and determining a traveling direction of the elevator car, and enabling the elevator door interlock device to be in the first state when the elevator car travels in a vertical direction, and to be in the second state when the elevator car travels in a horizontal direction and to switch to the first state to open or close the landing door after the elevator car reaches a landing door position, and to return to the second state when the elevator car continues to travel in the horizontal direction.

In an elevator door interlock operation method according to the present disclosure, optionally, the elevator door interlock device is configured to include two assemblies arranged opposite to each other, each assembly comprising: a base portion arranged on the elevator car; an operating portion movably mounted on the base portion; and a drive portion configured to drive the operating portion to move on the base portion such that the operating portion is capable of reaching a first position and a second position, wherein when respective operation portions of the two assemblies reach the first position and the second position, the elevator door interlock device is in the first state and the second state, respectively.

In an elevator door interlock operation method according to the present disclosure, optionally, each assembly further comprises a linkage mechanism, and one end of the linkage mechanism is connected to a power output end of the drive portion and the other end of the linkage mechanism is connected to the operating portion.

In an elevator door interlock operation method according to the present disclosure, optionally, after a roller of the landing door lock enters an operating zone defined by the operation portions of the two assemblies currently reaching the first position, the landing door is opened or closed through operation of the roller by the operating portion in the first state.

In an elevator door interlock operation method according to the present disclosure, optionally, the operating portion is made to move along a guide rail arranged on the base portion, and a limiting portion is arranged on the guide rail to limit a relative displacement of the operating portion with respect to the guide rail in the horizontal direction.

In an elevator door interlock operation method according to the present disclosure, optionally, the drive portion drives the operating portion to move on the base portion according to a control signal, the control signal including a position signal of the elevator car.

Furthermore, according to a third aspect of the present disclosure, an elevator system is further provided, comprising: an elevator car having a car door and traveling in a vertical and/or horizontal direction; a landing door configured to operate in linkage with the car door; and the elevator door interlock device according to any of the above that is arranged on the elevator car, wherein the elevator door interlock device is arranged on the elevator car, and is in the first state when the elevator car travels in a vertical direction, and in the second state when the elevator car travels in a horizontal direction and switches to the first state to open or close a landing door after the elevator car reaches a landing door position, and returns to the second state when the elevator car continues to travel in the horizontal direction.

The elevator door interlock device of the present disclosure not only has reliable working performance, but also has a compact structure, is easy to manufacture and install, and has low cost. It is suitable for use in the operating environments of the elevators in vertical and/or horizontal directions, and can reliably achieve elevator door interlock operations. The solution of the present disclosure can be applied to buildings with complex environmental requirements, which has good commercial value and application prospects.

BRIEF DESCRIPTION OF THE DRAWINGS

The technical solutions of the present disclosure will be described in further detail below with reference to the accompanying drawings and embodiments. However, it should be understood that these drawings are designed merely for the purpose of explanation and only intended to conceptually illustrate the structures and configurations described herein, and are not required to be drawn to scale.

DETAILED DESCRIPTION

Firstly, it should be noted that the structure, composition, characteristics, advantages, etc. of the elevator door interlock device, elevator door interlock operation method, and elevator system according to the present disclosure will be described below by way of examples. However, neither of the descriptions should be understood as limiting the present disclosure in any way. In the text, the technical terms “first”, “second” are only used for the purpose of distinguishing and are not intended to indicate the order and relative importance thereof. The technical term “connection” means that a specific component is directly and/or indirectly connected to another component.

In addition, for any single technical feature described or implied in the embodiments mentioned herein, or any single technical feature shown or implied in individual drawings, the present disclosure still allows for any combination or deletion of these technical features (or equivalents thereof) without any technical obstacle. Therefore, it should be considered that these more embodiments according to the present disclosure are also within the scope of the present disclosure. In addition, general matters known to those skilled in the art, such as the basic structure and working principle of the landing door lock, car door lock, elevator controller, etc. in an elevator system, will not be discussed herein.

Figure 1:
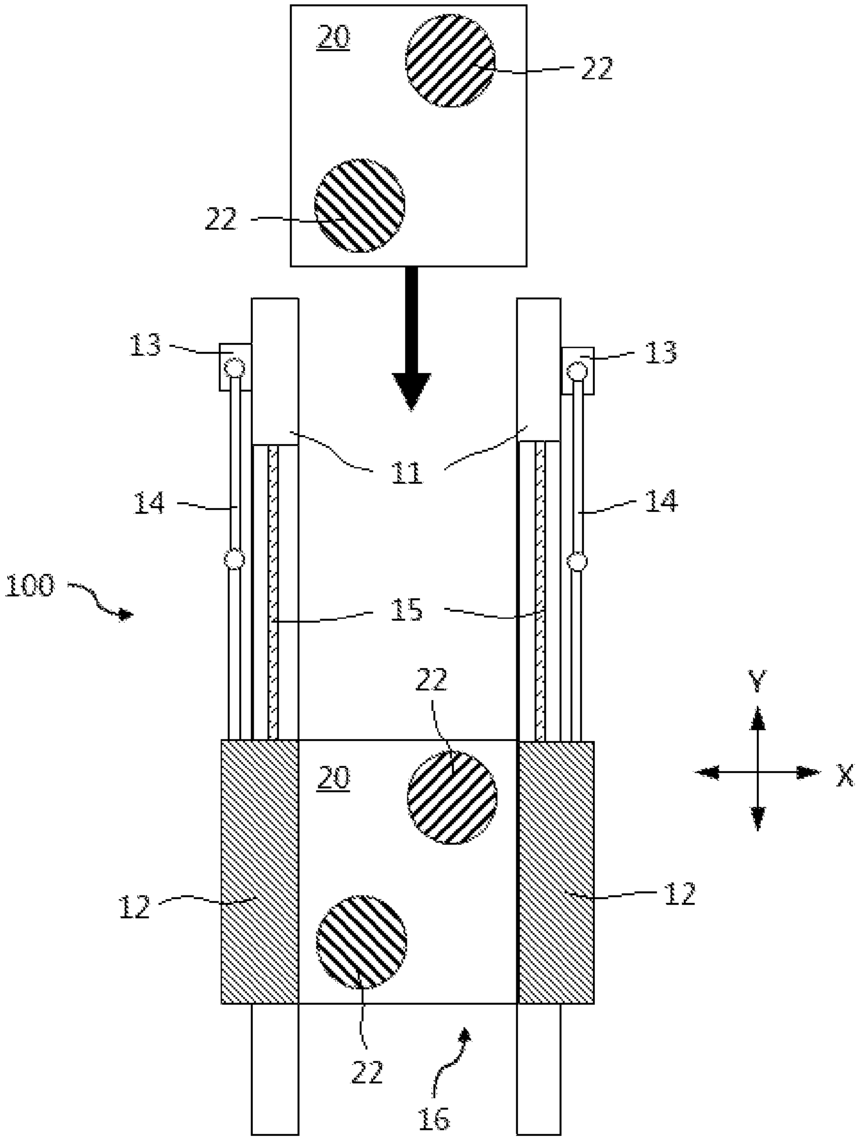
FIG. 1 is a schematic diagram showing the working state of an embodiment of an elevator door interlock device according to the present disclosure when the elevator car travels in a vertical direction, where a part of a landing door lock is also shown.
Figure 2:
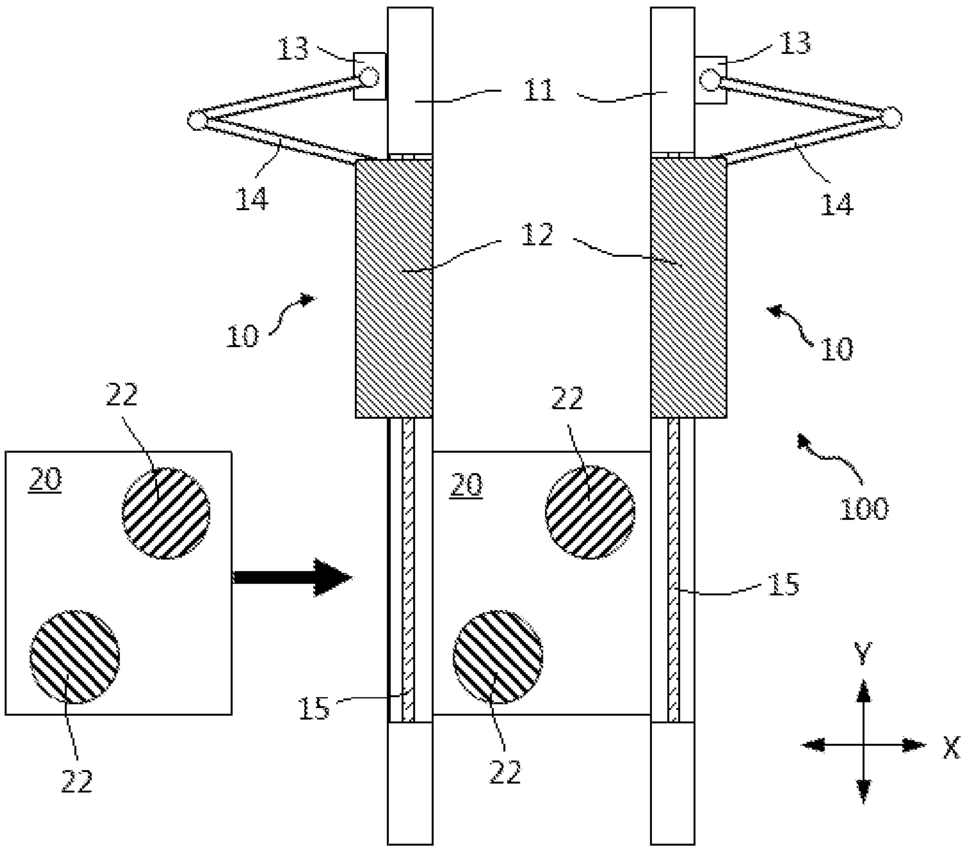
FIG. 2 is a schematic diagram showing the working state of the embodiment of the elevator door interlock device shown in FIG. 1 when the elevator car travels in a horizontal direction, where a part of a landing door lock is also shown.
Figure 3:
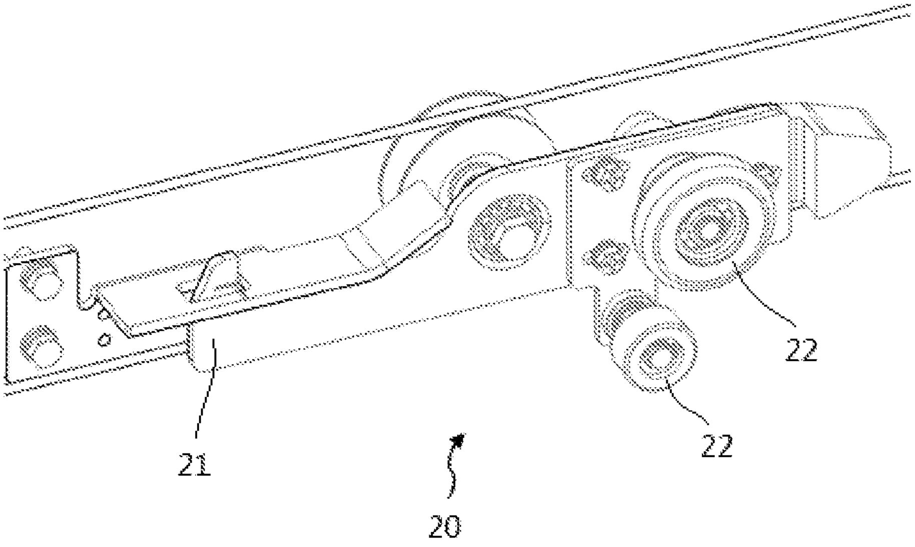
FIG. 3 is a local three-dimensional structural schematic diagram of an example of a landing door lock mounted on a landing door.

FIGS. 1 and 2 are the schematic diagrams showing the corresponding working states of an embodiment of an elevator door interlock device according to the present disclosure when the elevator car travels along the vertical direction Y and the horizontal direction X, respectively. FIG. 3 exemplarily shows a local three-dimensional structural schematic diagram of an example of a landing door lock. The following will introduce the device of the present disclosure in conjunction with these examples shown in the appended drawings.

In this embodiment, the elevator door interlock device 100 can be mounted at any suitable position on the elevator car, such as on the upper part of the car facing the landing door, so as to perform linkage operations with the landing door lock 20 arranged on the landing door of a specific landing. That is, when the elevator car reaches (or leaves) the specific landing, the elevator door interlock device 100 can perform corresponding operations on the landing door lock 20 to open or close the landing door. After the elevator car door and the landing door are opened through a linkage operation, passengers and other objects carried can leave the elevator car and enter the area where the current landing is located through the landing door, or passengers waiting to be carried at the specific landing can enter the elevator car from that landing, and then be carried by the elevator car to a new destination after the landing door is closed.

The elevator door interlock device 100 can have two different working states, i.e., a first state and a second state, which are exemplarily illustrated in FIGS. 1 and 2, respectively. In general, when the elevator door interlock device 100 is in the first state, it is allowed to operate the landing door lock 20 at the current landing of the elevator car to open or close the landing door as required. On the contrary, when the elevator door interlock device 100 is in the second state, it will not make contact with the landing door lock 20, that is, in the second state, the elevator door interlock operation will not be formed through the elevator door interlock device 100, thus allowing the landing door lock 20 to continue to lock the landing door and close it in general. By configuring the elevator door interlock device 100 to work in the two different states mentioned above, the device of the present disclosure can be applicable to building environments with complex structures and usage requirements, can meet the requirements that an elevator car can not only travel in the vertical direction of the building, but also in the horizontal direction of the building, and can be largely compatible with various types of elevator cars and their locks, landing doors and their locks, etc. manufactured and provided by different manufacturers.

Referring to the exemplary scenario shown in FIGS. 1 and 2, as an example, the elevator door interlock device 100 can be configured to have two assemblies 10, which are arranged opposite to each other on the elevator car, wherein each assembly 10 can be configured with a base portion 11, an operating portion 12, a drive portion 13, and a linkage mechanism 14.

Specifically, the base portion 11 is mounted on the elevator car as the basic part of the entire assembly, which can be used to carry components such as the operating portion 12, the drive portion 13, and the linkage mechanism 14. The base portion 11 can be configured into a suitable shape and be mounted and arranged according to specific application needs, such as adopting a linear strip shape and arranged in the vertical direction Y, as shown in this embodiment. Generally speaking, the base portion 11 can be made of rigid materials such as steel and iron, and suitable processing techniques such as casting and machining can be used. The specific configuration can be selected and designed as required, where the present disclosure makes no restrictions in this regard.

In the assembly 10, the operating portion 12 is movably mounted on the base portion 11. Specifically, the operating portion 12 is connected to the drive portion 13 through the linkage mechanism 14, so that the operating portion 12, when driven by the drive portion 13, can move on the base portion 11 to reach the first and second positions. The aforementioned first and second positions are exemplarily shown in FIGS. 1 and 2, respectively.

Referring to FIG. 1, it shows the scenario when the corresponding operation portions 12 of the two assemblies 10 reach their respective first positions, at which point, the elevator door interlock device 100 will be in the first state as mentioned above correspondingly. As shown in FIG. 1, in the first state, an operating zone 16 can be provided by the elevator door interlock device 100 to operate the landing door lock 20 at this point. In this embodiment, the operating zone 16 is defined and formed by two operation portions 12 that have reached their respective first positions. For example, when the elevator car travels in the vertical direction Y to reach the landing door position of a specific landing, the operable components (such as one or more rollers 22, etc.) in the landing door lock 20 that enter the operating zone 16 along the direction indicated by the arrow in the figure can be operated by the operating portion 12, which is schematically shown in FIG. 1. When operating such operable components, the locking part 21 (such as the lock hook, etc.) on the landing door lock 20 can be driven to be unlocked. For example, in the example, the operating portion 12 can squeeze the roller(s) 22 in the operating zone 16 to drive the locking part 21 to form a displacement so as to be unlocked (it can be appreciated that when an reverse operation is performed on the operable components, the landing door lock 20 can generate an opposite locking action). Thus, the elevator door interlock device 100 can open (or close) the landing door at the current landing of the elevator car by operating the landing door lock 20 in the first state.

With continued reference to FIG. 2, when the corresponding operation portions 12 of two assemblies 10 reach their respective second positions, the elevator door interlock device 100 will be in a second state correspondingly. As shown in FIG. 2, the operating portion 12 can be driven from the first position to the second position by the drive portion 13 via the linkage mechanism 14. At this point, the operating zone 16 formed when the operating portion 12 is in the first position will not exist anymore, so the operating portion 12 will not make contact with the landing door lock 20 for interlock operations to achieve unlocking or locking of the landing door. As such, even if the operable components (such as one or more rollers 22, etc.) on the landing door lock 20 enter the originally formed operating zone 16 along the direction indicated by the arrow shown in the figure, the elevator door interlock device 100 will not perform linkage operations on the landing door lock 20, thus allowing the landing door to continue to be locked and closed in the second state. In this way, when the elevator car travels in the horizontal direction X, the elevator door interlock device 100 can be placed in the second state. Then, after the elevator car reaches the landing door position of a target landing, the elevator door interlock device 100 can be switched from the second state to the first state and the landing door lock 20 can be operated accordingly to open the landing door and then close the landing door when necessary. The above process corresponds to the scenario in which the operating portion 12 is driven from the second position to the first position on the base portion 11 in the given embodiment, and then an operating zone 16 is formed at this position to operate the landing door lock 20 to unlock the landing door. After the landing door is opened, when the elevator car subsequently needs to leave the specific landing, the elevator door interlock device 100 can be made again to operate the landing door lock 20 to close the landing door in the first state. If the elevator car continues to travel in the horizontal direction X, it will cause the elevator door interlock device 100 to return from the first state to the second state, which corresponds to driving the operating portion 12 to move from the first position to the second position on the base portion 11 in the given embodiment, where in this second position and second state, interlock operations will not be formed on the landing door lock 20 at the subsequent landing where the elevator car arrives.

In the assembly 10, the operating portion 12 is configured to move on the base portion 11 to change its position, thereby changing the working state of the elevator door interlock device 100 accordingly. Optionally, a guide rail 15 can be arranged on the base portion 11 to better guide the operating portion 12 to move. Specifically, a limiting portion can be optionally arranged on the guide rail 15, which is used to make contact with the operating portion 12 and limit the relative displacement between the operating portion 12 and the guide rail 15 in the horizontal direction X to an expected range, where the specific values can be configured as required. This can make the relative movement of the operating portion 12 on the base portion 11 more stable and controllable, thereby making the interlock operations for the landing door lock 20 more accurate and reliable. The present disclosure does not impose any restrictions on the specific configuration of the limit unit, such as shape, size, and layout. For example, the limiting portion can be configured into the shape of a groove or protrusion and arranged along the length direction of the guide rail 15. This type of configuration and arrangement are not only simple in structure, but also easy to machine and compact in layout, thus effectively limiting the movement trajectory of the operating portion 12 relative to the base portion 11, so that the corresponding operations on the landing door lock 20 by the elevator door interlock device 100 can be effectively controlled.

The drive portion 13 is used to drive the operating portion 12 to move on the base portion 11, which can be achieved in any feasible form, such as using power devices that can provide mechanical force, hydraulic force, or electromagnetic force, like motors, hydraulic mechanisms, electromagnetic devices, and the like. The drive portions 13 in the respective assemblies 10 can each use a separate power device, or the corresponding drive portions 13 in the two assemblies 10 can share a same power device, for example, by configuring them to share a common motor. The drive portion 13 can control the operating portion 12 to move according to actual operational needs. For example, in one or some embodiments, the drive portion 13 can be configured to drive the operating portion 12 to move on the base portion 11 based on control signals, such as moving from the first position to the second position, and vice versa. The above control signals can include, but are not limited to, position signals of elevator cars. These signal data can be collected and provided by the corresponding sensors arranged at positions such as the elevator car, elevator hoistway, and a specific landing, or obtained by wireless and/or wired communication connection between the drive portion 13 and the control portion (such as elevator controllers) in the elevator system.

Of course, in one or some embodiments, a separate controller can also be configured for the elevator door interlock device 100 to control the operation of the drive portion 13. Such a controller can be an electronic controller containing a processor and associated memories. For example, the processors can include, but are not limited to any uniprocessors or multi-processors in a wide range of possible architecture arrays, such as Field Programmable Gate Arrays (FPGAs), Central Processing Units (CPUs), Application-specific Integrated Circuits (ASICs), and other hardware. Memory can be a storage device, such as random access memory (RAM), read-only memory (ROM), or any other computer-readable medium, in which computer executable instructions can be stored for execution by the processor.

It should be appreciated that the elevator door interlock device is described by way of example in conjunction with FIGS. 1 to 2, where these descriptions are for exemplary purposes, and the present disclosure fully allows for more feasible forms to implement the elevator door interlock device. For example, although the linkage mechanism 14 is configured in the given embodiment, with its two ends respectively connected to the power output ends of the operating portion 12 and the drive portion 13, in one or some embodiments, however, the linkage mechanism 14 can be removed or replaced with other forms of components. For example, in the case that the drive portion 13 is implemented by means of an electromagnetic device, the linkage mechanism 14 can be replaced with a tension spring. For another example, the linkage operation mode of the elevator door interlock device for the landing door lock should not be limited to the implementation mode of making contact with the roller(s) 22 in the landing door lock 20 in the given example, but allow implementations based on the corresponding configurations of various possible types of landing door locks. That is, as long as the operation and coordination between the corresponding operation parts of the elevator door interlock device and the landing door lock can achieve unlocking and locking of the landing door lock, no restrictions shall be imposed on the specific configuration of the landing door lock.

As mentioned above, the present disclosure innovatively provides elevator door interlock operations that can be compatible with elevator operation requirements in both vertical and horizontal directions, which is especially suitable for use in the ever-increasing sophisticated buildings with complex structural layouts and application requirements in modern society. In contrast, it is difficult for traditional elevator products that can only travel in the vertical direction to meet these building's requirements for elevator door interlock operations for elevator operating conditions in both the vertical and horizontal directions. The device of the present disclosure successfully solves the above problem, and it has many advantages such as compact structure, reliable working performance, low cost, and easy manufacturing, installation, and use, making it particularly suitable for installation and application in relatively complex building environments.

According to the solution of the present disclosure, an elevator system is also provided, which can be configured with an elevator car, a landing door that is in linkage operation with a car door of the elevator car, and an elevator door interlock device that can be arranged on the elevator car designed and provided according to the present disclosure. In the elevator system, when the elevator car travels along the vertical direction of the building, the elevator door interlock device can be placed in a first state. When the elevator car travels along the horizontal direction of the building, the elevator door interlock device can be placed in a second state, and after the elevator car reaches a landing door position, it is then switched to the first state to open or close the landing door as needed. Then, when the elevator car continues to travel in the horizontal direction, the elevator door interlock device is made to return to the second state, so as to avoid undesired contact operation with the landing door at the landing of arrival during horizontal operation of the elevator car, which may cause equipment damage, inability to open or close the landing door, and the like. The elevator system according to the present disclosure can be widely used as a transportation device in relatively complex building environments as mentioned above.

Figure 4:
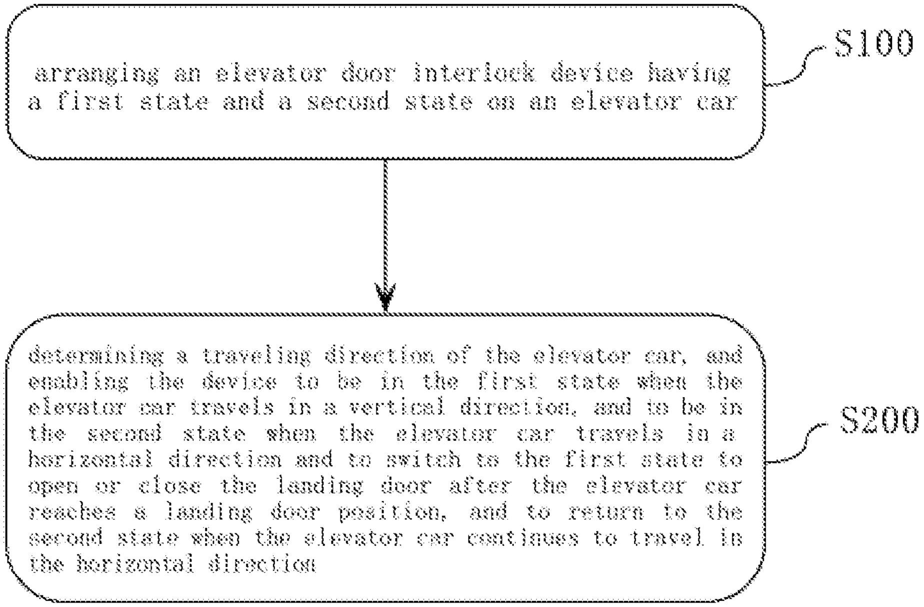
FIG. 4 is a schematic diagram of the processing flow of an embodiment of an elevator door interlock operation method according to the present disclosure.

In addition, according to the design concept of the present disclosure, an elevator door interlock operation method is further provided. FIG. 4 is a schematic flowchart of an embodiment of a method according to the present disclosure, which may include the following steps:

In step S100, an elevator door interlock device having a first state and a second state can be arranged on an elevator car, wherein the elevator door interlock device is allowed to operate the landing door lock at the current arrival position of the elevator car to open or close the landing door in the first state, and the elevator door interlock device is not allowed to make contact with the landing door lock in the second state. Regarding the elevator door interlock device, landing door lock, first state, second state, and other contents, as detailed discussions have been provided previously in the text, reference can be made to the corresponding descriptions and no further discussion will be provided herein.

In step S200, the current traveling direction of the elevator car is determined, such that the elevator door interlock device is made to be in the first state when the elevator car travels in the vertical direction, and the elevator door interlock device is made to be in the second state when the elevator car travels in the horizontal direction, and is switched from the second state to the first state to open or close the landing door as needed after the elevator car travels horizontally to the landing door position of the target landing. Then, when the elevator car continues to travel horizontally, the elevator door interlock device is made to return to the second state, and after that, the elevator car can travel horizontally towards a new target landing. As mentioned earlier, if the elevator car travels along the vertical direction subsequently, the elevator door interlock device can be made to operate in the first state. As to how to determine the traveling direction of the elevator car, it can be directly obtained from the elevator controller in the elevator system, or learned from operating parameter signals (e.g., position, speed direction, acceleration direction, etc.) of the elevator car, where these data can be collected using various sensors mentioned above.

As another example, in one or some embodiments of the method according to the present disclosure, in the case where two assemblies as described earlier are configured in the elevator door interlock device, after the operable components (such as rollers, etc.) on the landing door lock enters the operating zone as described earlier, the operation portions in the assemblies can operate the landing door lock to open or close the landing door in the first state.

Furthermore, in one or some embodiments of the method according to the present disclosure, the operating portion in the aforementioned assembly can be made to move along the guide rail arranged on the base portion of the assembly, and the limiting portion arranged on the guide rail is used to limit the relative displacement of the operating portion with respect to the guide rail in the horizontal direction. Optionally, the drive portion can be used to drive the operating portion to move on the base portion according to control signals (such as the position signal of the elevator car). The drive portion can be implemented by means of any feasible form of power device using, for example, mechanical force, hydraulic force, or electromagnetic force. For example, motors, hydraulic mechanisms, electromagnetic devices, etc. can be selected to be used as required.

Those skilled in the art can appreciate that since the elevator door interlock device, assembly, landing door lock, first state, second state, linkage operation and other technical contents have been described in detail previously in the text, reference can be made to the specific descriptions and contents of the corresponding parts above, thus forming more possible steps and configurations according to the method of the present disclosure, which will not be repeated herein.

The elevator door interlock device, elevator door interlock operation method, and elevator system according to the present disclosure have been described above in detail by way of examples only. These examples are merely used to illustrate the principles and embodiments of the present disclosure, rather than limiting the present disclosure. Various modifications and improvements can be made by those skilled in the art without departing from the scope of the present disclosure. Therefore, all equivalent technical solutions should fall within the scope of the present disclosure and be defined by the claims of the present disclosure.

What is claimed is:

1. An elevator door interlock device, wherein the elevator door interlock device is arranged on an elevator car and has a first state in which it is allowed to operate a landing door lock at a current arrival position of the elevator car to open or close a landing door, and a second state in which it makes no contact with the landing door lock, and the elevator door interlock device is configured to be in the first state when the elevator car travels in a vertical direction, and to be in the second state when the elevator car travels in a horizontal direction and to switch to the first state to open or close the landing door after the elevator car reaches a landing door position, and to return to the second state when the elevator car continues to travel in the horizontal direction;

wherein the elevator door interlock device comprises two assemblies arranged opposite to each other, each assembly comprising:

a base portion arranged on the elevator car;

an operating portion movably mounted on the base portion; and a drive portion configured to drive the operating portion to move on the base portion such that the operating portion is capable of reaching a first position and a second position, wherein when respective operation portions of the two assemblies reach the first position and the second position, the elevator door interlock device is in the first state and the second state, respectively;

wherein the base portion is provided with a guide rail, and the operating portion is configured to move along the guide rail.

2. The elevator door interlock device according to claim 1, wherein each assembly further comprises a linkage mechanism, and one end of the linkage mechanism is connected to a power output end of the drive portion and the other end of the linkage mechanism is connected to the operating portion.

3. The elevator door interlock device according to claim 1, wherein an operating zone is defined by the operation portions of the two assemblies currently reaching the first position, such that after a roller of the landing door lock enters the operating zone, the landing door is opened or closed through operation of the roller by the operating portion in the first state.

4. The elevator door interlock device according to claim 1, wherein a limiting portion is arranged on the guide rail, and the limiting portion is configured to make contact with the operating portion and limit its relative displacement with respect to the guide rail in the horizontal direction.

5. The elevator door interlock device according to claim 4, wherein the limiting portion comprises a groove or a protrusion arranged along a length direction of the guide rail.

6. The elevator door interlock device according to claim 1, wherein the drive portion comprises a motor and is configured to drive the operating portion to move on the base portion according to a control signal, the control signal including a position signal of the elevator car.

7. The elevator door interlock device according to claim 1, wherein the elevator door interlock device further comprises a controller configured to control operation of the drive portion.

8. An elevator system, comprising:

an elevator car having a car door and traveling in a vertical and/or horizontal direction;

a landing door configured to operate in linkage with the car door; and the elevator door interlock device according to claim 1, wherein the elevator door interlock device is arranged on the elevator car, and is in the first state when the elevator car travels in a vertical direction, and in the second state when the elevator car travels in a horizontal direction and switches to the first state to open or close a landing door after the elevator car reaches a landing door position, and returns to the second state when the elevator car continues to travel in the horizontal direction.

9. An elevator door interlock operation method, comprising steps of:

arranging an elevator door interlock device having a first state and a second state on an elevator car, wherein the elevator door interlock device is allowed to operate a landing door lock at a current arrival position of the elevator car to open or close a landing door in the first state, and to make no contact with the landing door lock in the second state; and determining a traveling direction of the elevator car, and enabling the elevator door interlock device to be in the first state when the elevator car travels in a vertical direction, and to be in the second state when the elevator car travels in a horizontal direction and to switch to the first state to open or close the landing door after the elevator car reaches a landing door position, and to return to the second state when the elevator car continues to travel in the horizontal direction;

wherein the elevator door interlock device is configured to include two assemblies arranged opposite to each other, each assembly comprising:

a base portion arranged on the elevator car;

an operating portion movably mounted on the base portion; and a drive portion configured to drive the operating portion to move on the base portion such that the operating portion is capable of reaching a first position and a second position, wherein when respective operation portions of the two assemblies reach the first position and the second position, the elevator door interlock device is in the first state and the second state, respectively;

wherein the operating portion is made to move along a guide rail arranged on the base portion, and a limiting portion is arranged on the guide rail to limit a relative displacement of the operating portion with respect to the guide rail in the horizontal direction.

10. The elevator door interlock operation method according to claim 9, wherein each assembly further comprises a linkage mechanism, and one end of the linkage mechanism is connected to a power output end of the drive portion and the other end of the linkage mechanism is connected to the operating portion.

11. The elevator door interlock operation method according to claim 9, wherein after a roller of the landing door lock enters an operating zone defined by the operation portions of the two assemblies currently reaching the first position, the landing door is opened or closed through operation of the roller by the operating portion in the first state.

12. The elevator door interlock operation method according to claim 9, wherein the drive portion drives the operating portion to move on the base portion according to a control signal, the control signal including a position signal of the elevator car.

* * * * *